(12) United States Patent
Kyhl

(10) Patent No.: US 11,319,985 B2
(45) Date of Patent: May 3, 2022

(54) ISOLATION JOINT WITH SPHERICAL BEARING AND INTEGRAL ANGLE MEASUREMENT

(71) Applicant: Raytheon Company, Waltham, MA (US)

(72) Inventor: Curtis Kyhl, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/984,002

(22) Filed: Aug. 3, 2020

(65) Prior Publication Data

US 2022/0034358 A1    Feb. 3, 2022

(51) Int. Cl.
| | |
|---|---|
| *F16C 11/06* | (2006.01) |
| *F16C 17/12* | (2006.01) |
| *F16M 13/02* | (2006.01) |
| *B63B 25/00* | (2006.01) |
| *B60R 11/00* | (2006.01) |
| *B64D 47/00* | (2006.01) |

(52) U.S. Cl.
CPC .............. *F16C 11/06* (2013.01); *F16C 17/12* (2013.01); *F16M 13/022* (2013.01); *B60R 11/00* (2013.01); *B60R 2011/0089* (2013.01); *B63B 25/00* (2013.01); *B64D 47/00* (2013.01); *F16C 2233/00* (2013.01)

(58) Field of Classification Search
CPC ...... F16C 11/06; F16C 17/12; F16C 2233/00; F16M 13/022; B63B 25/00; B60R 11/00; B60R 2011/0089; B64D 47/00
USPC ....................................................... 248/542
See application file for complete search history.

(56) References Cited

U.S. PATENT DOCUMENTS

| | | | |
|---|---|---|---|
| 3,703,999 A | 11/1972 | Forys et al. | |
| 4,101,102 A | 7/1978 | Lloyd | |

(Continued)

FOREIGN PATENT DOCUMENTS

| | | |
|---|---|---|
| EP | 2798314 A1 | 11/2014 |
| WO | WO 2015/149079 A1 | 10/2015 |
| WO | WO 2018/107330 A1 | 6/2018 |

OTHER PUBLICATIONS

International Search Report for International Application No. PCT/US2020/056126 dated Feb. 3, 2020, 10 pages.

(Continued)

*Primary Examiner* — Muhammad Ijaz

(57) ABSTRACT

An isolation joint with an integral angle measurement system. The isolation joint includes a suspension interface yoke, a payload support member, a spherical bearing, and an integral angle measurement system. The suspension interface yoke includes a suspension interface configured to couple the suspension interface yoke to one or more suspension bars. The payload support member includes a payload interface configured to couple a payload to the payload support member. The spherical bearing includes an inner race secured to one of the suspension interface yoke and the payload support member and an outer race secured to the other of the suspension interface yoke and the payload support member. The integral angle measurement system includes a plurality of position sensors configured to measure a change in position between the suspension interface yoke and the payload support member.

23 Claims, 9 Drawing Sheets

(56) References Cited

U.S. PATENT DOCUMENTS

| | | | |
|---|---|---|---|
| 4,498,038 A * | 2/1985 | Malueg | B64D 47/08 |
| | | | 248/550 |
| 5,368,271 A | 11/1994 | Kiunke et al. | |
| 5,897,223 A * | 4/1999 | Tritchew | G03B 15/006 |
| | | | 396/13 |
| 6,263,160 B1 | 7/2001 | Lewis | |
| 6,454,229 B1 * | 9/2002 | Voigt | G01C 21/18 |
| | | | 248/182.1 |
| 6,484,978 B2 | 11/2002 | Voigt et al. | |
| 11,059,430 B2 * | 7/2021 | Higashimachi | G03B 17/561 |
| 2014/0055617 A1 * | 2/2014 | Minikey, Jr | F16F 1/32 |
| | | | 348/148 |
| 2017/0175948 A1 * | 6/2017 | Zeise | F16M 11/126 |
| 2019/0113922 A1 * | 4/2019 | Koyama | F16M 11/2007 |
| 2020/0247329 A1 * | 8/2020 | Robertson, Jr. | G02B 7/021 |
| 2020/0392987 A1 * | 12/2020 | Koike | F16C 19/527 |
| 2021/0190500 A1 * | 6/2021 | Miller | G01C 21/18 |

OTHER PUBLICATIONS

Leonardo Drs, Mast Muonted Sight (MMS), https://www.leonardodrs.com/media/3296/mms_datasheet.pdf, to the best of applicant's knowledge article was available before the application filing date, 2 pages, Melbourne, Florida.

Miller, Kirk A., U.S. Appl. No. 16/721,662, filed Dec. 19, 2019.

International Search Report for International Application No. PCT/US2021/010033 dated Nov. 24, 2021, 10 pages.

* cited by examiner

ISOLATION JOINT WITH SPHERICAL BEARING AND INTEGRAL ANGLE MEASUREMENT

BACKGROUND

Imaging and sensing devices (e.g., electro-optical sensors, cameras, microphones, and/or audio recording/sensing devices) are utilized in a wide variety of situations, conditions, applications, and systems. For example, imaging devices are used on a wide variety of moving vehicles travelling on land, sea, or through the air. In such situations, an imaging device on a moving vehicle is required to maintain focus on a variety of points, including far distant points, and to obtain stable imagery and sensing on the various points while the vehicle is in motion. As such, outside movements of a system (e.g., vehicle) to which the imaging device is attached can affect the stability or efficacy of the imaging device. Consequently, images taken by the imaging device can be compromised, blurry, unclear, or unhelpful due to the movements of the system. Furthermore, sensing results of imaging devices, audio recording/sensing devices, and/or optical sensors can be inaccurate or unobtainable due to the effects of these outside movements on the sensor. Outside movements can be those that result from the system undergoing normal or intended operation (e.g., temporal angular movements of a moving vehicle), as well as movements resulting from one or more unintended forces, or forces acting on the system (shock loads, vibration, and others).

In order for an imaging or sensing device to achieve stable sensing and/or imagery, it is advantageous for the imaging or sensing device to be stabilized against the outside movements of a system. Stabilization of the imaging or sensing device can minimize the effect that the outside movements have on the imaging or sensing device. Stabilization can require a joint that is free to rotate in three degrees of rotational freedom and fixed in three degrees of translation, and an angle measurement system to provide feedback for stabilization. Past attempts at a joint for stabilizing the imaging or sensing device have included flex pivots and nested cardan joints. Flex pivots are advantageous in that they can be relatively compact and allow for three degrees of rotational freedom while being fixed in three degrees of translational degrees of freedom. However, these have relatively little travel (e.g. 1 to 2.5 degrees), can be complex with many small parts, and are susceptible to fatigue and shock failures. Nested cardan joints can be much more durable than flex pivots, but may still have may small parts. They can provide extended travel relative to a flex pivot, but can have reduced translational stiffness due to the nested cardan joints, can be relatively bulky, and can have compounding radial play in the multiple bearing sets.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
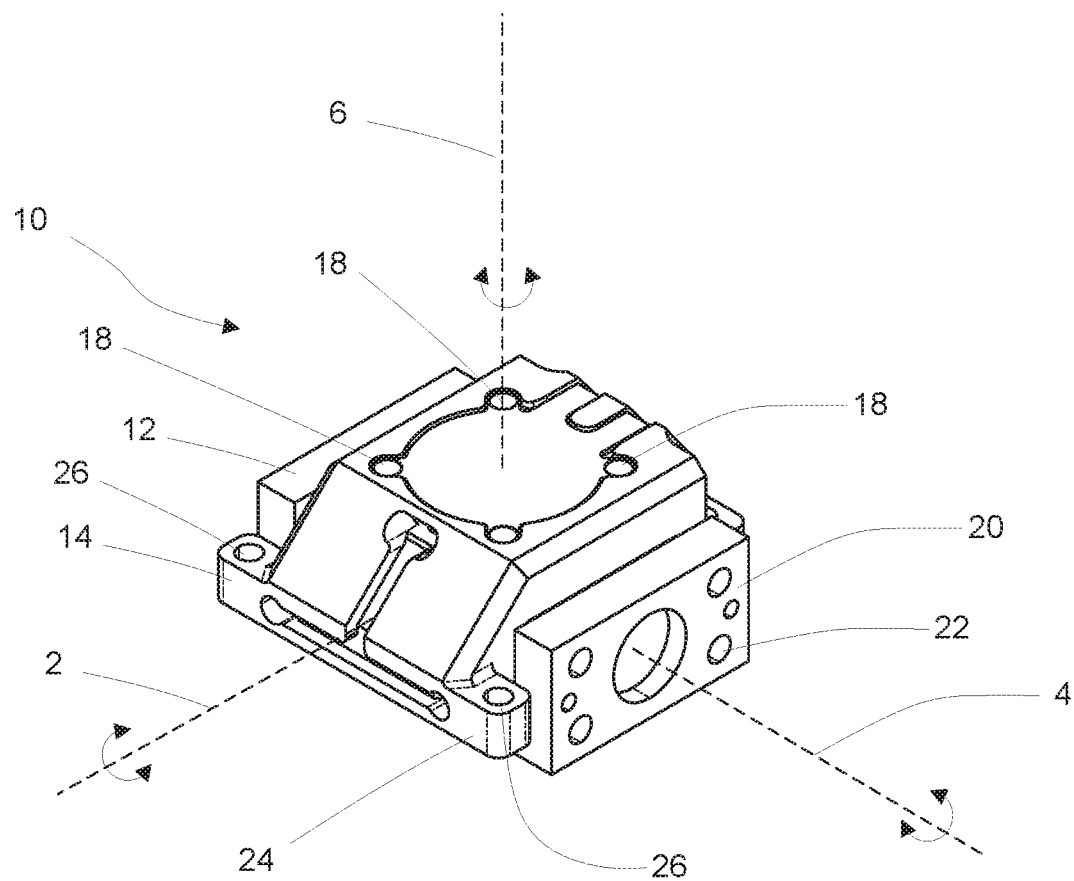
FIG. 1 is an isometric view of a spherical isolation joint with integral angle measurement in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the disclosure is provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure is directed to an isolation joint for stabilizing a device mounted on a moving system. The present disclosure is also directed to various isolation joint assemblies and a method of configuring an isolation joint.

In one example, disclosed is an isolation joint with integral angle measurement system. The isolation joint comprises a suspension interface yoke, a payload support member, a spherical bearing, and an integral angle measurement system. The suspension interface yoke comprises a suspension interface configured to couple the suspension interface yoke to one or more suspension bars. The payload support member comprises a payload interface configured to couple a payload to the payload support member. The spherical bearing comprises an inner race secured to one of the suspension interface yoke and the payload support member and an outer race secured to the other of the suspension interface yoke and the payload support member. The inner race is rotatable relative to the outer race about three orthogonal rotational axes and fixed in translation relative to the three orthogonal translational axes. The integral angle measurement system comprises a plurality of position sensors configured to measure a change in position between the suspension interface yoke and the payload support member. Each of the plurality of position sensors is secured to one of the payload support member or the suspension interface yoke.

In accordance with a more detailed aspect, the isolation joint can further comprise a bearing retainer and a retaining member. The suspension interface yoke can further comprise a socket sized and shaped to receive the outer race of the spherical bearing and the bearing retainer can be configured to retain the outer race within the socket. The inner race of the spherical bearing can comprise an aperture, and the payload support member can comprise a shaft sized and shaped to be received in the aperture of the inner race and the retaining member can be configured to retain the shaft within the aperture of the inner race.

In accordance with a more detailed aspect, the bearing retainer can comprise a sensor target and at least one position sensor of the plurality of position sensors can be proximate the sensor target.

In accordance with a more detailed aspect, the suspension interface yoke can have at least one sensor target secured to the suspension interface yoke and at least one position sensor is secured to the payload support member proximate the at least one sensor target.

In accordance with a more detailed aspect, the integral angle measurement system can comprise a first pair of position sensors operable to measure relative rotation of the suspension interface yoke and the payload support member about a first rotational axis, a second pair of position sensors operable to measure relative rotation of the suspension interface yoke and the payload support member about a second rotation axis orthogonal to the first rotational axis, and a third pair of position sensors operable to measure relative rotation of the suspension interface yoke and the payload support member about a third axis of rotation orthogonal to the first rotation axis and the second rotation axis.

In accordance with a more detailed aspect, the integral angle measurement system can comprise a plurality of sensor targets supported by at least one of the suspension interface yoke or the payload support member proximate the plurality of position sensors. In accordance with a more detailed aspect, the sensor targets can comprise or be formed of titanium.

In accordance with a more detailed aspect, the isolation joint can further comprise a plurality of rotational hard stops configured to inhibit rotation of the payload support member relative to the suspension interface yoke.

In accordance with a more detailed aspect, the payload support member further can comprise a recess sized and shaped to receive at least a portion of the suspension interface yoke.

Also disclosed is a system for inertially stabilizing a payload. The system comprises a support structure, a payload, and an isolation joint. The support structure comprises one or more suspension bars. The isolation joint is rotatably coupled to the support structure via the one or more suspension bars and comprises a suspension interface yoke, a payload support member, a spherical bearing, and an integral angle measurement system. The suspension interface yoke comprises a suspension interface coupling the suspension interface yoke the one or more suspension bars. The payload support member comprises a payload interface coupling the payload to the payload support member. The spherical bearing comprises an inner race secured to one of the suspension interface yoke and the payload support member and an outer race secured to the other of the suspension interface yoke and the payload support member. The inner race is rotatable relative to the outer race about three orthogonal rotational axes and fixed in translation along the three orthogonal axes. The integral angle measurement system comprises a plurality of position sensors configured to measure a change in position between the suspension interface yoke and the payload support member. Each of the plurality of position sensors is secured to one of the payload support member or the suspension interface yoke.

In accordance with another aspect, the payload can comprise an imaging device.

In accordance with another aspect, the payload can comprise a sensor.

In accordance with another aspect, the suspension interface yoke can comprise a socket sized and shaped to receive the outer race of the spherical bearing and a bearing retainer configured to retain the outer race within the socket. The inner race of the spherical bearing can comprise an aperture and the payload support member can comprise a shaft sized and shaped to be received in the aperture of the inner race and a retaining member configured to retain the shaft within the aperture of the inner race.

In accordance with another aspect, the bearing retainer can comprise a sensor target and at least one position sensor of the plurality of position sensors can be proximate the sensor target.

In accordance with another aspect, the suspension interface yoke can have at least one sensor target secured to the suspension interface yoke and at least one position sensor secured to the payload support member proximate the at least one sensor target.

In accordance with another aspect, the integral angle measurement system can comprise a first pair of position sensors operable to measure relative rotation of the suspension interface yoke and the payload support member about a first rotational axis, a second pair of position sensors operable to measure relative rotation of the suspension interface yoke and the payload support member about a second rotation axis orthogonal to the first rotational axis, and a third pair of position sensors operable to measure relative rotation of the suspension interface yoke and the payload support member about a third axis of rotation orthogonal to the first rotation axis and the second rotation axis.

In accordance with another aspect, the sensor target can comprise titanium.

In accordance with another aspect, the system can further comprise a plurality of rotational hard stops configured to inhibit rotation of the payload support member relative to the suspension interface yoke.

In accordance with another aspect, the payload support member can further comprise a recess sized and shaped to receive at least a portion of the suspension interface yoke.

Also disclosed is a method of configuring an isolation joint having integral angle measurement. The method comprises securing a first race of a spherical bearing to a suspension interface yoke, the suspension interface yoke comprising a suspension interface configured to couple the suspension interface yoke to one or more suspension bars. The method also comprises securing a second race of the spherical bearing to a payload support member, the payload support member comprising a payload interface configured to couple a payload to the payload support member. The method also comprises securing a plurality of position sensors to at least one of the payload support member or the suspension interface yoke as part of an integral angle measurement system operable to measure a change in position between the suspension interface yoke and the payload support member. The method can further comprise securing a plurality of targets, as part of the integral angle measurement system, to at least one of the payload support member or the suspension interface yoke proximate the plurality of position sensors.

In another aspect, the first race can be secured to the spherical bearing by a bearing retainer. In one example, the bearing retainer can be configured as a target for at least one position sensor of the plurality of position sensors.

To further describe the present technology, examples are now provided with reference to the figures. FIGS. 1 through 6 illustrate a rotational isolation joint 10 with integral angle measurement in accordance with at least one example of the present disclosure. The isolation joint 10 can comprise a suspension interface yoke 12, a payload support member 14, a spherical bearing 16 (see FIG. 3), and an integral angle measurement system (e.g. position sensors 18). As will be described further, the suspension interface yoke 12 and the payload support member 14 can be joined by the spherical bearing 16 to enable the suspension interface yoke 12 and the payload support member 14 to rotate relative to one another about three orthogonal axes (e.g, roll axis 2, elevation axis 4, and cross elevation axis 6) while being fixed in translation along the axes.

Figure 9:
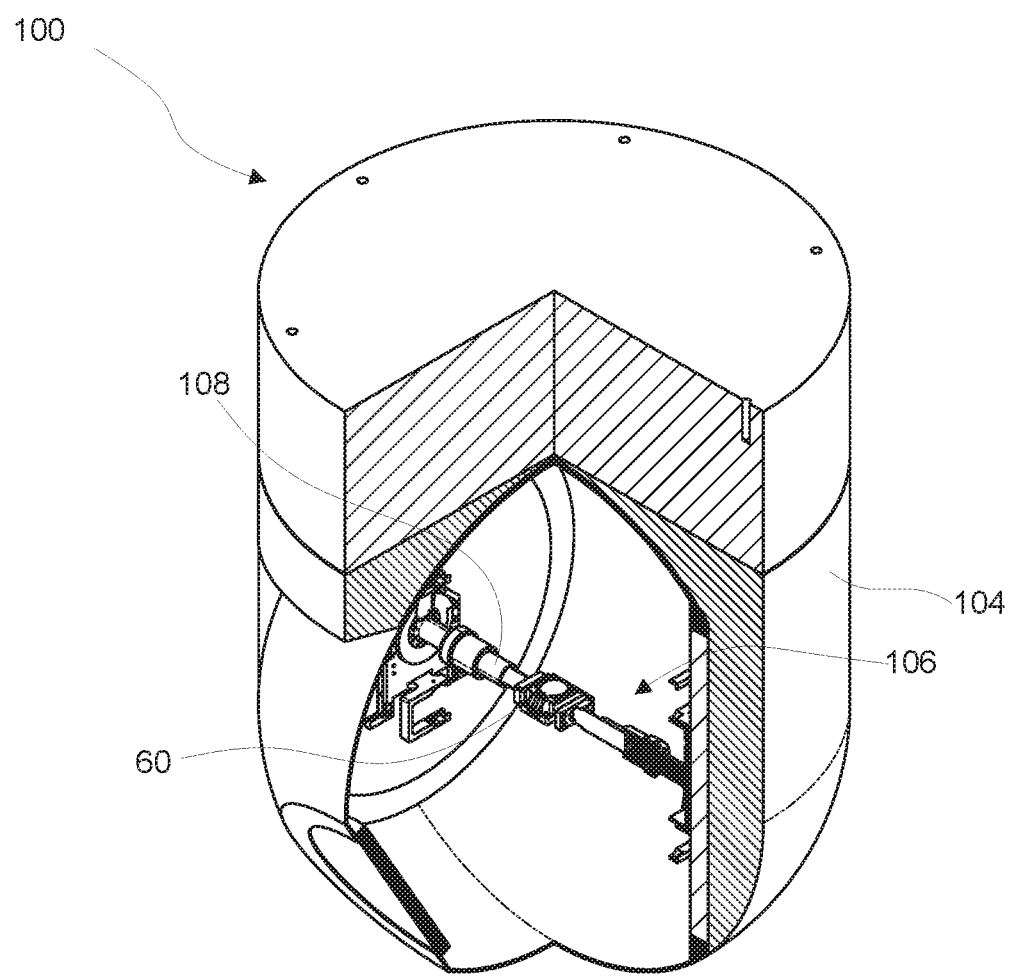
FIG. 9 shows a partial isometric view of the example turret of FIG. 8 with an outer coarse gimbal and suspension or cross bar assembly, with a section of the turret cut away to illustrate the rotational isolation joint as supported inside the turret.

The suspension interface yoke 12 can comprise a suspension interface 20 configured to couple the suspension interface yoke 12 to one or more suspension bars (see system of FIG. 9). The suspension interface 20 can comprise a mount or mounting surface having threaded sockets, through holes, or other features as known to one of ordinary skill in the art. For example, the suspension interface 20 of FIGS. 1 through 6 comprises a plurality of threaded sockets 22 formed in the mount or mounting surface which can receive a threaded fastener. Thus, a threaded fastener can pass through a mounting hole of a suspension bar and be secured within a threaded socket 22 of the suspension interface 20 to secure the suspension bar to the suspension interface yoke 12.

The payload support member 14 can comprise a payload interface 24 configured to couple a payload to the payload support member 14. The payload interface 24 can comprise a mount or a mounting surface having threaded sockets, through holes, or other features. For example, the payload interface 24 of FIGS. 1 through 6 comprises a plurality of threaded sockets 26 formed in the mount or mounting surface, which can receive a threaded fastener. Thus, a threaded fastener can pass through a mounting hole of a payload and be secured within a threaded socket 26 of the payload interface 24 to secure the payload to the payload support member 14.

The spherical bearing 16 can comprises an inner race 28 and an outer race 30 (see FIG. 6) and is characterized by the outer race 30 being able to rotate about three orthogonal rotation axes relative to the inner race 28 (e.g. roll axis 2, elevation axis 4, and cross elevation axis 6) while being fixed in translation about these axes. The inner race 28 can have a partially spherical outer surface and the outer race 30 can have a partially spherical inner surface complementing the partially spherical outer surface of the inner race 28. The spherical inner surface of the outer race 30 can be sized and configured to interface with at least a portion of the spherical outer surface of the inner race 28 at any given relative rotational position between the inner race 28 and the outer race 30, thus providing a range of angular travel sufficient to facilitate rotation of the inner and outer races 28 and 30, respectively, relative to one another in the three rotation axes. Ball bearing(s) (not shown) can be positioned between the outer surface of the inner race 28 and the inner surface of the outer race 30 to reduce friction between the inner race 28 and the outer race 30.

The integral angle measurement system can comprise a plurality of position sensors 18 configured to measure a change in position between the suspension interface yoke 12 and the payload support member 14. The position sensors 18 can be secured to one of the payload support member 14 or the suspension interface yoke 12 and are configured to sense the relative position of the other of the payload support member 14 or the suspension interface yoke 12. In one example, the position sensors 18 can be supported within apertures formed in one of the payload support member 14 or the suspension interface yoke 12. The position sensors 18 can be generally arranged in three pairs, with each pair arranged to measure angular movement about an axis such as roll axis 2, elevation axis 4, and cross elevation axis 6.

Each position sensor 18 of a pair of position sensors can be arranged and supported in a position so as to be symmetrically located about an axis of rotation. Thus, as the suspension interface yoke 12 and the payload support member 14 rotate relative to one another about an axis associated with a pair of position sensors 18, a first position sensor will measure a first location approaching the first position sensor and a second position sensor will measure a corresponding second location moving away from the second position sensor. In the example of FIGS. 1-6, a first pair 7 of position sensors measure rotation about the roll axis 2, a second pair 8 of position sensors measure rotation about the elevation axis 4, and a third pair 9 of position sensors measure rotation about the cross-elevation axis 6. In one example, the position sensors can comprise pairs of differential position sensors. The differential position sensors can utilize eddy current phenomena, but capacitive, optical or inductive phenomena can be used as well. Integral angle measurement can also be accomplished using inertial sensors, fiber optic gyros, Kaman pickoffs, and/or any other suitable sensors for sensing and determining movement and/or displacement of a target or body.

Each position sensor of the pairs of position sensors 18 can measure a change in linear position between the payload support member 14 and suspension yoke 12 and generate data based on the measured movement and/or displacement. Since each of the position sensors 18 is at a fixed distance from the center of rotation, the relative change in linear position can be used to calculate a change in relative angle between the payload support member 14 and the suspension yoke 12 for each axis. The data can be analyzed by a computer, having one or more processors and one or more memories, utilizing a software program to capture, indicate, categorize or model movement/displacement behavior of payload interface housing 14. The sensor measurements and/or data can be used to as a feedback signal to a stabilization system to stabilize the angular position of the payload.

To assist the position sensors 18 in the measurement of angular movement, a target can be secured to a component, such as to either the suspension interface yoke 12 or the payload support member 14, for the position sensors to sense. The target can be posited adjacent a position sensor 18, meaning that the target and the position sensor 18 are suitably positioned relative to one another, such that the position sensor is able to detect, sense, and measure relative movement of the target relative to the position sensor. The sensors can be calibrated for a specific target material. In some examples, the target can be formed of a durable material that provides greater accuracy compared to the material forming the isolation joint 10. For example, the target can comprise titanium which may be less sensitive to environmental changes compared to the material forming the isolation joint, but this is not intended to be limiting in any way. The target can be positioned proximate a position sensor 18 in a plane perpendicular to an axis of rotation to detect movement between the position sensor 18 and the target about the axis of rotation. In the example of FIGS. 1-6, two targets 48 are secured to the suspension interface yoke 12 to assist the third pair 9 of position sensors 18 in determining rotation about the cross-elevation axis 6.

The suspension interface yoke 12 can comprise a socket 32 (see FIG. 2) sized and shaped to receive the outer race 30 of the spherical bearing 16. For example, if the outer race 30 has a cylindrical outer shape, the socket 32 can have a cylindrical inner shape. The socket 32 can be slightly oversized relative to the outer race 30 to allow the outer race 30 to slide within the socket 32, or in some examples, the socket 32 can be sized the same as, or slightly smaller than, the outer race to allow the outer race 30 to be press fit within the socket 32 to secure the spherical bearing 16.

The isolation joint 10 can further comprise a bearing retainer 34 configured to retain the spherical bearing 16 within the socket 32 of the suspension interface yoke 12. The bearing retainer 34 can be secured to the suspension interface yoke 12 using conventional means, such as fasteners (e.g., bolts 36). Using the bearing retainer 34, the outer race 30 can be clamped between the bearing retainer 34 and the suspension interface yoke 12 with the spherical bearing 16 positioned in the socket 32 to retain the spherical bearing 16 within the socket 32 of the suspension interface yoke 12. In some examples, the bearing retainer 34 can be configured, and can function as, a target for a plurality of the position sensors 18. For example, the bearing retainer 34 can be formed of titanium and act as a target for the position sensors 18, such as the first pair 7 of position sensors 18 for measuring rotation about the roll axis 2 and the second pair 8 of position sensors 18 for measuring rotation about the elevation axis 4. Or, in another example, titanium plugs may be secured to the bearing retainer 34, which can act as targets for at least some of the plurality of position sensors 18, such as the first pair 7 of position sensors and the second pair 8 of position sensors.

The isolation joint 10 can further comprise a retaining member 38 configured to secure the spherical bearing 16 to the payload support member 14. The inner race 28 of the spherical bearing 16 can comprise an aperture 40 (see FIG. 6) for receiving a portion of and securing the payload support member 14. The retaining member 38 can couple to the payload support member 14 through the aperture 40 clamping the inner race 28 between the payload support member 14 and the retaining member 38. In the example of FIGS. 1-6, the payload support member 14 further comprises a shaft 42 sized and shaped to be received in the aperture 40 of the inner race 28. For example, the shaft 42 can have an outer cylindrical surface complementary to an inner cylindrical surface of the aperture 40. The shaft 42 can be received in the aperture 40 and the retaining member 38 secured to the shaft 42 to couple the inner race 28 of the spherical bearing 16 to the payload support member 14. The retaining member 38 can have a threaded end and the shaft 42 can have a complementary threaded socket for receiving the threaded end to secure the shaft 42 to the retaining member 38.

Figure 2:
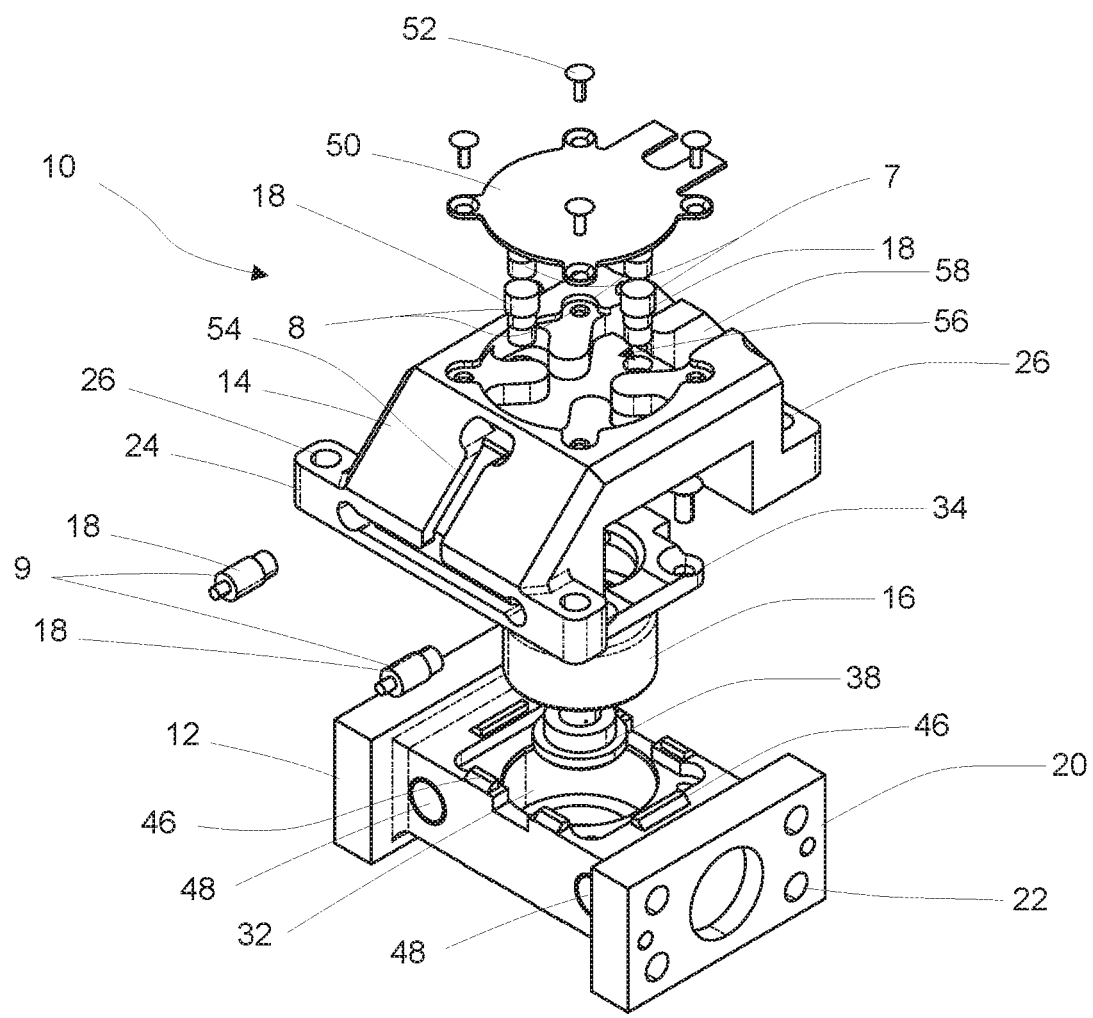
FIG. 2 is an exploded isometric view of the rotational isolation joint shown in FIG. 1.
Figure 3:
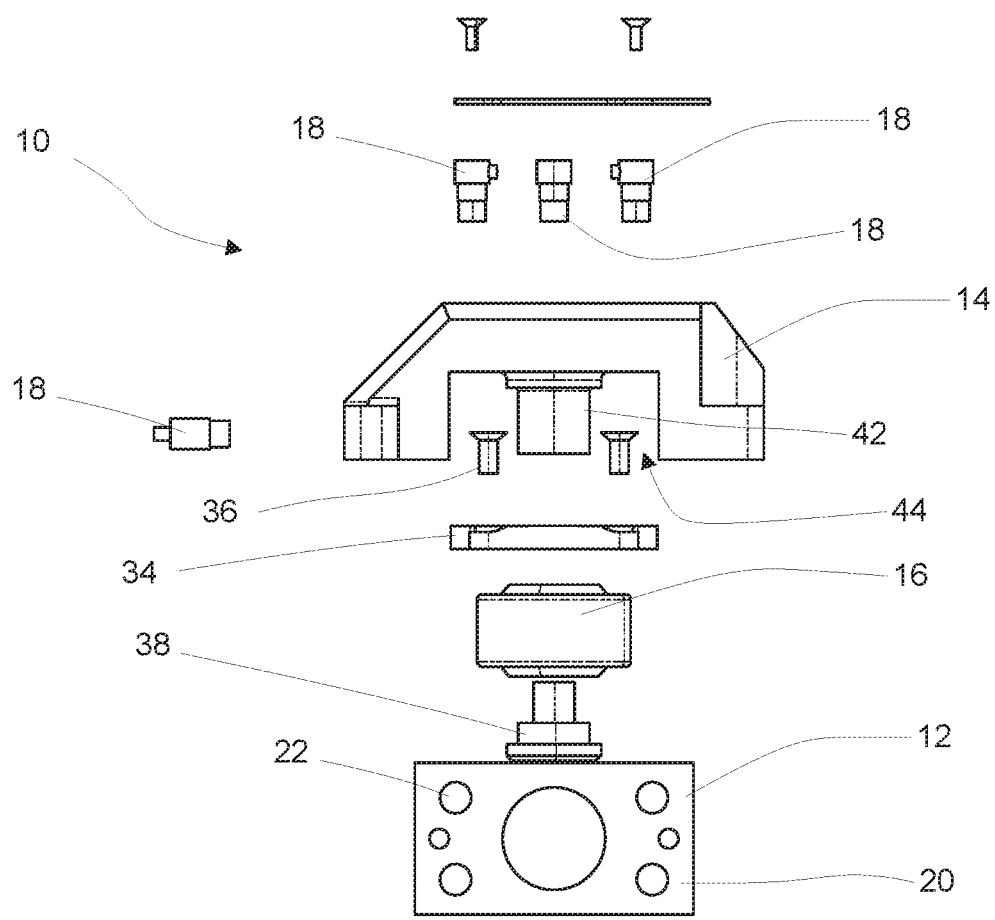
FIG. 3 is an exploded side view of the rotational isolation joint shown in FIG. 1.
Figure 4:
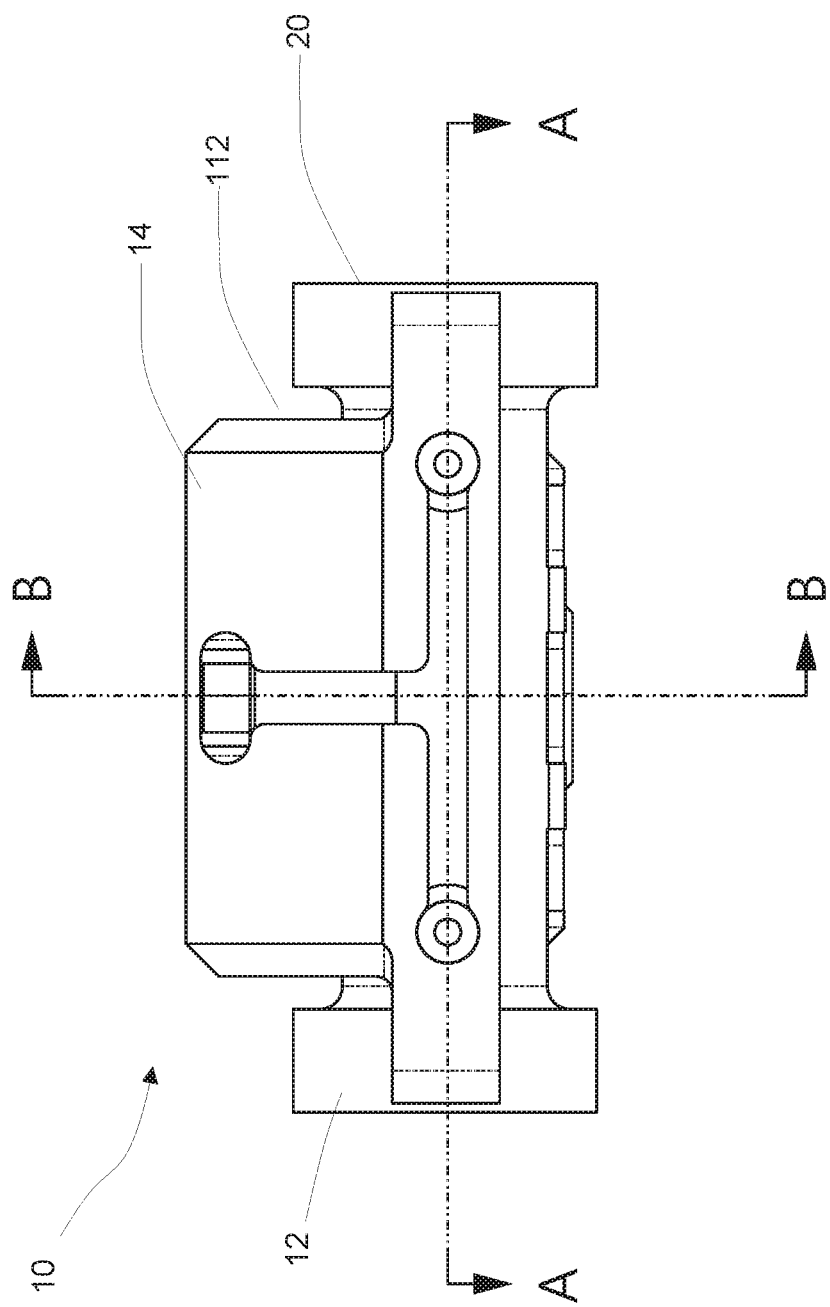
FIG. 4 is a front view of the rotational isolation joint shown in FIG. 1.
Figure 5:
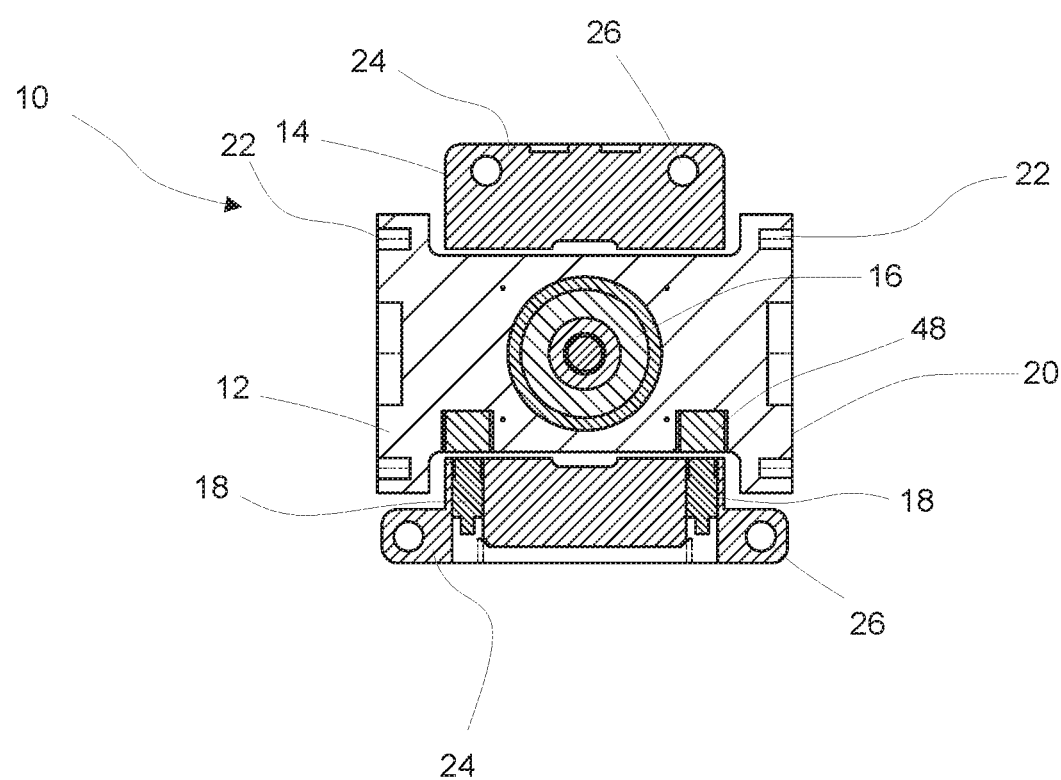
FIG. 5 is a cross section of the rotational isolation joint shown in FIG. 1 taken about line AA of FIG. 4.
Figure 6:
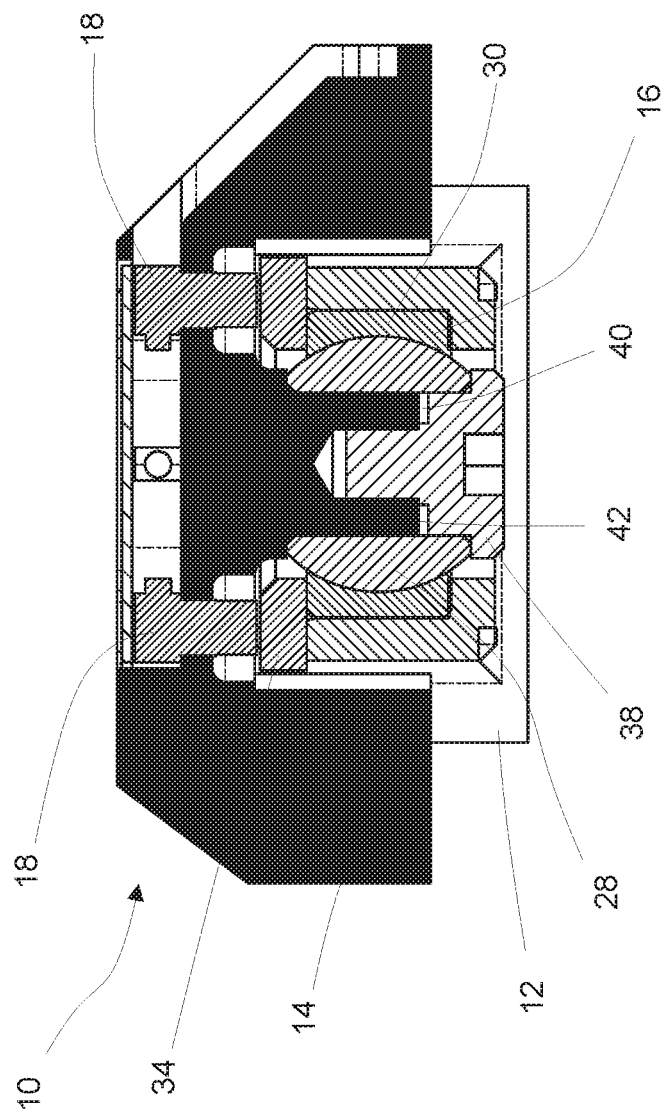
FIG. 6 is a cross section of the rotational isolation joint shown in FIG. 1 taken about line BB of FIG. 4.

The payload support member 14 and the suspension interface yoke 12 can be sized and configured to nest with one another to reduce the profile of the isolation joint 10. In the example shown, the payload support member 14 can further comprise a recess 44 size and shaped to receive at least a portion of the suspension interface yoke 12 (e.g., a reduced width intermediate or middle portion). Thus, the suspension interface yoke 12 can nest within the recess 44 to reduce the height of the isolation joint 10. Of course, other nesting configurations are possible and contemplated herein. Furthermore, the payload support member 14 and/or the suspension interface yoke 12 can comprise hard stops to prevent the payload support member 14 from over rotating relative to the suspension interface yoke 12. For example, as shown in FIG. 2, the suspension interface yoke 12 comprises hard stops 46 that can prevent over rotation of the payload support member 14 about axes orthogonal to a central axis of the spherical bearing 16. The hard stops 46 can be sized and positioned based on a desired maximum rotation of the payload support member 14. For instance, the hard stops 46 can be sized and positioned to mimic the limits of older isolation joint designs.

A cover 50 can be secured to the payload support member 14 to protect the position sensors 18. The cover 50 can be secured to the payload support member 14 using conventional means, such as screws 52. The payload support member 14 can further comprise various channels and/or recesses formed therein to allow for routing of wires connected to the position sensors 18.

For example, the payload support member 14 of FIGS. 1-6 comprises a first channel 54 formed in a front face or surface interconnecting the third pair 9 of position sensors 18. The payload support member 14 further comprises a recess 56 formed in an upper surface providing a space proximate the first and second pairs 7, 8 of position sensors 18. A second channel 58 formed in the payload support member 14 can be in communication with the recess 56 proximate the first and second pairs 7, 8 of position sensors 18. Cables connected to the various position sensors or position sensor pairs can be routed along and through the channel 54, the recess 56 and the channel 58 to maintain these below the outer perimeter surfaces of the payload support member 14, and to facilitate the routing of the cables out of and away from the rotational isolation joint 10. Those skilled in the art will recognize that the design, configuration and location of the channels can vary, and can be different from those shown and described herein.

Figure 7:
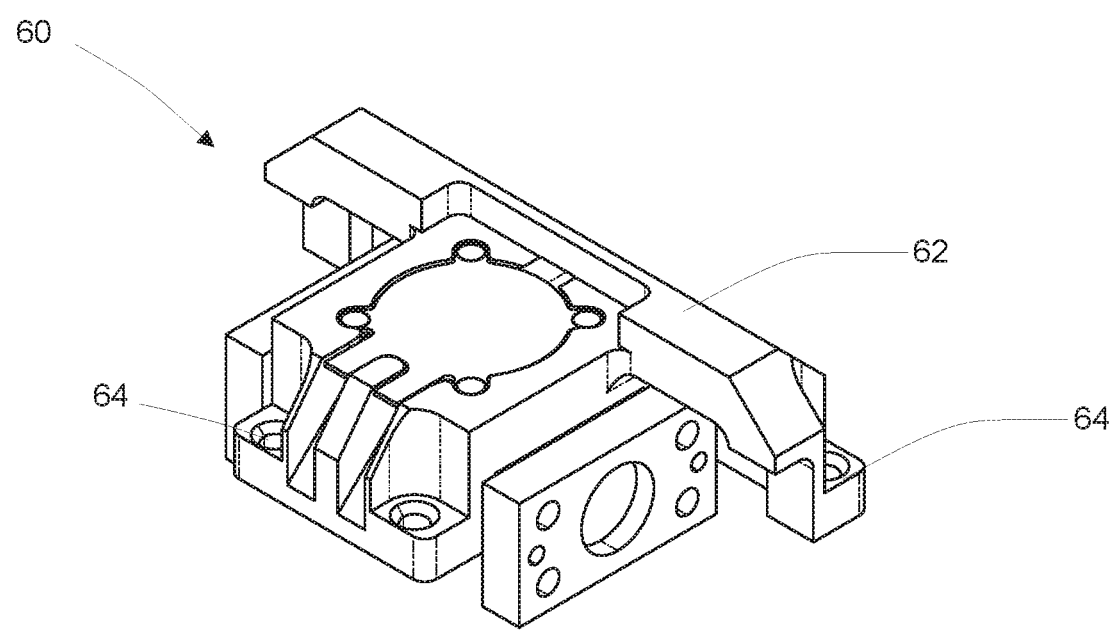
FIG. 7 is an isometric view of a rotational isolation joint in accordance with an example of the present disclosure.

FIG. 7 illustrates another example of an isolation joint 60 with integral angle measurement. The isolation joint 60 is similar to the isolation joint 10 of FIGS. 1-6 and like items will not be discussed further. However, the isolation joint 60 of FIG. 7 differs from the isolation joint 10 of FIGS. 1-6 in that isolation joint 60 has a payload support member 62 comprising a payload interface 64 to couple to a different payload than a payload associated with the isolation joint 10 of FIGS. 1-6. In some examples, the remaining structure may be otherwise the same such that different payloads can be mounted using different payload support members 62. The different payload support members 62 can have a payload support interface that is complementary to interfaces of different payloads.

The described examples of an isolation joint provide a robust joint that allows rotation in three degrees of rotational freedom while being rigid in translation. The design provides a greater amount of rotation than many traditional designs and is compact, while also providing an integrated angle measurement system. Furthermore, the design is relatively easy to assemble without requiring any complex fixtures. For example, a joint comprising a traditional flex plate design can require many steps to assemble (e.g. secure position sensors, temporarily install flex tines, prepare alignment fixture, take initial measurements, move pivot to another fixture, center based on initial measurement, secure flex tines, verify centering measurements, assemble the mechanical components, prepare alignment fixture again, and scale the pivot assembly). In contrast, the isolation joint described herein can be assembled using three steps including securing the position sensors, assembling the mechanical parts, and scaling the pivot assembly. Assembly can be completed without the use of complex centering fixtures that can be required in prior designs.

Figure 8:
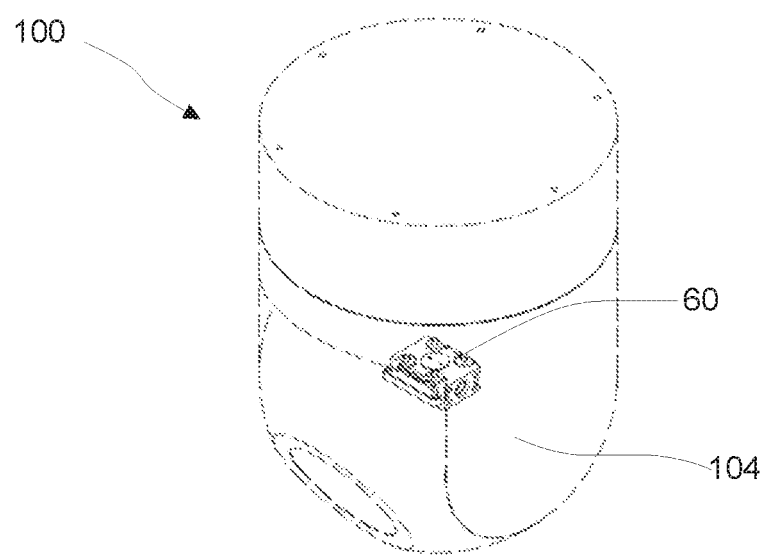
FIG. 8 shows an isometric view of an example system comprising a turret having an outer coarse gimbal and suspension bar assembly in support of the rotational isolation joint of FIG. 7, the turret being shown in dotted lines to illustrate the positioning of the spherical isolation joint.

As shown in FIG. 8, an isolation joint as discussed herein (e.g., isolation joint 10 or 60, with isolation joint 60 being shown in FIGS. 8 and 9) with integral angle measurement can be part of a system 100 (e.g., a payload mount system), which can be used to house an information-gathering device or payload (not shown) that obtains audio and/or visual information, signals, and/or imagery. The payload, for example, can be a camera, electro-optical sensor, microphone, or other imaging, sensing, and/or measuring device that benefits from stabilization when obtaining data or information. Such payloads can operate on and/or be mounted to a variety of moving vehicles (via the payload mount system) that can travel on or in water, on land, in or through the air, or in space. Such payloads can obtain imagery and/or data by focusing on single distant points in order to obtain the imagery, information, and/or data.

In order to stabilize a payload mounted to a moving vehicle and to help the payload to obtain stable imagery and data, it is beneficial to mount the isolation joint and the payload supported thereon to one or more gimbals that substantially isolate or decouple the payload, in one or more rotational degrees of freedom, from the movement of the vehicle in order to minimize the effect of vehicle movement on the payload. For example, the system 100 can comprise a payload mount system in the form of a coarse gimbal 104 (e.g., a two-axis coarse gimbal) that can house the payload, the isolation joint 60 in support of the payload, and a crossbar system (see FIG. 9) that provides suspension support of the isolation joint 10. The coarse gimbal 104 can comprise one or more orthogonal axes (e.g. 1-3 orthogonal axes) and can be used for coarse pointing of a payload supported by the coarse gimbal. As shown in FIG. 8 and FIG. 9, the coarse gimbal 104 can be a vehicle-mounted turret which houses the isolation joint 60 and a payload (not shown) that is mounted on the isolation joint 60. Coarse gimbal 104 can also have systems for measuring relative angles between moving structures of coarse gimbal axes. The relative angle measurements can be used to control each coarse gimbal axis as well as to calculate coordinate transformations that can be used to estimate the distant point location at which the payload will point.

As shown in FIG. 9, the isolation joint 60 can be supported within the system 100 and can provide improved vehicle motion isolation for an imaging device/system or other payload mounted to the isolation joint 60. Isolation joint 60 acts as a fine inner gimbal inside of the coarse gimbal 104. Addition of a fine inner gimbal (e.g. isolation joint 60) allows for improved and additional isolation from vibration, shock and other undesirable loads that may be transferred to or that otherwise propagate through the system 100 as a result of vehicle movement. As shown, isolation joint 60 is attached to the innermost coarse gimbal axis by a crossbar support structure or system 106 which can include one or more suspension or crossbars 108. As shown, suspension or crossbars 106 attach to and interface with the suspension interface (e.g., see suspension interface 20) of the suspension interface yoke (e.g., see suspension interface yoke 12) of the isolation joint 60. The specific configuration of the suspension or crossbars 106, and the method of attaching the suspension or crossbars 106 to the suspension interfaces, as well as the payload system mounts (e.g., a turret) are not described in detail herein. However, example crossbar systems (e.g., those having crossbars and/or crossbar assemblies) configured to provide suspension support of the isolation joint 60 and a payload, such as the isolation joint 60 and a sensor or sensor assembly as described herein, and that can be part of a payload system mount (e.g., a turret mounted to a vehicle that supports the crossbar system in support of the isolation joint 60 and the payload), are described in detail in application Ser. No. 16/721,726, filed Dec. 19, 2019, application Ser. No. 16/721,754, filed Dec. 19, 2019, application Ser. No. 16/721,792, filed Dec. 19, 2019, and application Ser. No. 16/844,805, filed Apr. 9, 2020 (which claims priority to U.S. Provisional Application No. 62/950,921 filed Dec. 19, 2019), each of which are incorporated by reference in their entirety herein. As such, the present disclosure sets forth a payload mount system comprising a two-axis coarse gimbal set, such as that provided by a turret having a coarse azimuth platform rotatable with respect to a base (the base being attachable to a vehicle) and a coarse elevation platform rotatable relative to the azimuth platform, a three-axis fine gimbal set provided by the isolation joint 60 discussed herein, and a crossbar system providing suspension support to the isolation joint 60 and the payload supported by the isolation joint 60, wherein the crossbar system is supported by the coarse elevation platform.

Isolation joint 60 can have three orthogonal degrees of limited angular travel. In one example, the limited angular travel of the isolation joint 60 can range from 2 degrees to 10 degrees. Although, the isolation joint 60 can still be functional with limited angular travel outside of this range.

Isolation joint 60 can have an integrated angle measurement system, such as integral angle measurement system described herein comprising one or sensors that are configured to measure the position of the payload mount relative to the suspension interface yoke 12. Relative angle measurement can be used to keep inner surfaces of the coarse gimbal 82 from colliding with the payload due to limited sway space between payload and inner surfaces of the coarse gimbal and/or the limited angular travel of the isolation joint 60. Inertial sensors (e.g. fiber optic gyros) can be used to provide feedback to control the payload line of sight for stable imaging/sensing of a distant point.

According to the various features, components, and functions described in this disclosure, the concepts described herein present several improvements over current flexure and cardan joints and device stabilization technology. The single bearing provides a high translational stiffness and is capable of withstanding higher loads and vibrations compared to flexure joints and cardan joints while maintaining a low isolation frequency. Additionally, having a single bearing may reduce bearing friction compared to the multiple nested bearing of a cardan joint. Furthermore, the single bearing does not result in compounding radial play as found in the multiple bearings of a cardan joint.

Reference was made to the examples illustrated in the drawings and specific language was used herein to describe the same. It will nevertheless be understood that no limitation of the scope of the technology is thereby intended. Alterations and further modifications of the features illustrated herein, and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An isolation joint with integral angle measurement, comprising:
    a suspension interface yoke comprising a suspension interface configured to couple the suspension interface yoke to one or more suspension bars;
    a payload support member comprising a payload interface configured to couple a payload to the payload support member;
    a spherical bearing having an inner race secured to one of the suspension interface yoke and the payload support member and an outer race secured to the other of the suspension interface yoke and the payload support member, wherein the inner race is rotatable relative to the outer race about three orthogonal rotational axes and fixed in translation relative to three orthogonal translational axes; and
    an integral angle measurement system comprising a plurality of position sensors configured to measure a change in position between the suspension interface yoke and the payload support member, each of the plurality of position sensors being secured to one of the payload support member or the suspension interface yoke.

2. The isolation joint with integral angle measurement of claim 1, further comprising a bearing retainer and a retaining member, wherein the suspension interface yoke further comprises a socket sized and shaped to receive the outer race of the spherical bearing and the bearing retainer is configured to retain the outer race within the socket, the inner race of the spherical bearing comprises an aperture, and the payload support member comprises a shaft sized and shaped to be received in the aperture of the inner race and the retaining member is configured to retain the shaft within the aperture of the inner race.

3. The isolation joint with integral angle measurement of claim 2, wherein the bearing retainer comprises a sensor target and at least one position sensor of the plurality of position sensors is proximate the sensor target.

4. The isolation joint with integral angle measurement of claim 1, wherein the integral angle measurement system comprises a plurality of sensor targets supported by at least one of the suspension interface yoke or the payload support member proximate the plurality of position sensors.

5. The isolation joint with integral angle measurement of claim 4, wherein the sensor targets are formed of titanium.

6. The isolation joint with integral angle measurement of claim 1, wherein the integral angle measurement system comprises a first pair of position sensors operable to measure relative rotation of the suspension interface yoke and the payload support member about a first rotational axis, a second pair of position sensors operable to measure relative rotation of the suspension interface yoke and the payload support member about a second rotation axis orthogonal to the first rotational axis, and a third pair of position sensors operable to measure relative rotation of the suspension interface yoke and the payload support member about a third axis of rotation orthogonal to the first rotation axis and the second rotation axis.

7. The isolation joint with integral angle measurement of claim 1, further comprising a plurality of rotational hard stops configured to inhibit rotation of the payload support member relative to the suspension interface yoke.

8. The isolation joint with integral angle measurement of claim 1, wherein the payload support member further comprises a recess sized and shaped to receive at least a portion of the suspension interface yoke.

9. The isolation joint with integral angle measurement of claim 1, further comprising at least one channel or recess formed in a surface of the payload support member to facilitate the routing of cables connected to the plurality of position sensors out of and away from the isolation joint.

10. A system for inertially stabilizing a payload, comprising:
    a support structure comprising one or more suspension bars;
    the payload; and
    an isolation joint with integral angle measurement coupled to the support structure via the one or more suspension bars, the isolation joint with integral angle measurement comprising:
        a suspension interface yoke comprising a suspension interface coupling the suspension interface yoke to the one or more suspension bars;
        a payload support member comprising a payload interface coupling the payload to the payload support member, the suspension interface yoke and the payload support member being movably supported relative to one another;
        a spherical bearing having an inner race secured to one of the suspension interface yoke and the payload support member and an outer race secured to the other of the suspension interface yoke and the payload support member, wherein the inner race is rotatable relative to the outer race about three orthogonal rotational axes and fixed in translation along the three orthogonal axes; and an integral angle measurement system comprising a plurality of position sensors configured to measure a change in position between the suspension interface yoke and the payload support member, each of the plurality of position sensors being secured to one of the payload support member or the suspension interface yoke.

11. The system of claim 10, wherein the payload comprises an imaging device.

12. The system of claim 10, wherein the payload comprises a sensor.

13. The system of claim 10, wherein the suspension interface yoke comprises a socket sized and shaped to receive the outer race of the spherical bearing and a bearing retainer configured to retain the outer race within the socket, the inner race of the spherical bearing comprises an aperture, and the payload support member comprises a shaft sized and shaped to be received in the aperture of the inner race and a retaining member configured to retain the shaft within the aperture of the inner race.

14. The system of claim 13, wherein the bearing retainer comprises a sensor target and at least one position sensor of the plurality of position sensors is proximate the sensor target.

15. The system of claim 10, wherein the suspension interface yoke has at least one sensor target secured to the suspension interface yoke and at least one position sensor is secured to the payload support member proximate the at least one sensor target.

16. The system of claim 10, wherein the integral angle measurement system comprises a first pair of position sensors operable to measure relative rotation of the suspension interface yoke and the payload support member about a first rotational axis, a second pair of position sensors operable to measure relative rotation of the suspension interface yoke and the payload support member about a second rotation axis orthogonal to the first rotational axis, and a third pair of position sensors operable to measure relative rotation of the suspension interface yoke and the payload support member about a third axis of rotation orthogonal to the first rotation axis and the second rotation axis.

17. The system of claim 16, wherein the integral angle measurement system comprises a plurality of sensor targets supported proximate at least one of the first, second or third pairs of position sensors.

18. The system of claim 10, further comprising a plurality of rotational hard stops configured to inhibit rotation of the payload support member relative to the suspension interface yoke.

19. The system of claim 10, wherein the payload support member further comprises a recess sized and shaped to receive at least a portion of the suspension interface yoke.

20. A method of configuring an isolation joint having integral angle measurement, comprising:
securing a first race of a spherical bearing to a suspension interface yoke, the suspension interface yoke comprising a suspension interface configured to couple the suspension interface yoke to one or more suspension bars;
securing a second race of the spherical bearing to a payload support member, the payload support member comprising a payload interface configured to couple a payload to the payload support member, wherein the first race is rotatable relative to the second race about three orthogonal rotational axes and fixed in translation relative to three orthogonal translational axes; and
securing a plurality of position sensors to at least one of the payload support member or the suspension interface yoke as part of an integral angle measurement system operable to measure a change in position between the suspension interface yoke and the payload support member.

21. The method of claim 20, further comprising securing the first race to the spherical bearing using a bearing retainer.

22. The method of claim 21, further comprising configuring the bearing retainer as a target for at least one position sensor of the plurality of position sensors.

23. The method of claim 20, further comprising securing a plurality of targets, as part of the integral angle measurement system, to at least one of the payload support member or the suspension interface yoke proximate the plurality of position sensors.

* * * * *